US008576774B2

(12) United States Patent
Ghosh

(10) Patent No.: US 8,576,774 B2
(45) Date of Patent: Nov. 5, 2013

(54) METHOD OF GENERATING LOW PEAK-TO-AVERAGE POWER RATIO (PAPR) BINARY PREAMBLE SEQUENCES FOR OFDM SYSTEMS

(75) Inventor: Monisha Ghosh, Chappaqua, NY (US)

(73) Assignee: Koninklijke Philips N.V., Eindhoven (NL)

( * ) Notice: Subject to any disclaimer, the term of this patent is extended or adjusted under 35 U.S.C. 154(b) by 698 days.

(21) Appl. No.: 12/522,928

(22) PCT Filed: Jan. 14, 2008

(86) PCT No.: PCT/IB2008/050116
§ 371 (c)(1),
(2), (4) Date: Jul. 13, 2009

(87) PCT Pub. No.: WO2008/087579
PCT Pub. Date: Jul. 24, 2008

(65) Prior Publication Data
US 2010/0027473 A1    Feb. 4, 2010

Related U.S. Application Data

(60) Provisional application No. 60/884,937, filed on Jan. 15, 2007.

(51) Int. Cl.
*H04J 11/00*   (2006.01)
*H04L 27/28*   (2006.01)
*H04W 4/00*   (2009.01)

(52) U.S. Cl.
USPC ............................................. 370/328

(58) Field of Classification Search
USPC ............................... 370/328; 375/260
See application file for complete search history.

(56) References Cited

U.S. PATENT DOCUMENTS

| | | | |
|---|---|---|---|
| 5,926,070 A | | 7/1999 | Barron |
| 2003/0026295 A1* | | 2/2003 | Baum et al. ............... 370/503 |
| 2005/0164655 A1* | | 7/2005 | Nakao et al. ............... 455/101 |
| 2005/0186933 A1* | | 8/2005 | Trans ......................... 455/296 |
| 2005/0286474 A1* | | 12/2005 | van Zelst et al. .......... 370/334 |
| 2006/0062196 A1* | | 3/2006 | Cai et al. ................... 370/345 |
| 2006/0183504 A1* | | 8/2006 | Tanaka et al. ............. 455/561 |
| 2006/0193394 A1* | | 8/2006 | Tanaka et al. ............. 375/260 |
| 2006/0239375 A1* | | 10/2006 | Kim et al. .................. 375/267 |
| 2007/0189263 A1* | | 8/2007 | Izumi et al. ................ 370/350 |
| 2008/0080461 A1* | | 4/2008 | Lee ............................ 370/342 |
| 2009/0245090 A1* | | 10/2009 | Budianu et al. ........... 370/210 |
| 2010/0020732 A1* | | 1/2010 | Gaddam et al. ........... 370/310 |

FOREIGN PATENT DOCUMENTS

WO   WO2005043791 A2   5/2005
WO   WO2005067216 A2   7/2005

OTHER PUBLICATIONS

IEEE, A Cognitive PHY/MAC Proposal for IEEE 802.22 WRAN Systems, Nov. 2005, IEEE 802.22-05/0103r0, pp. 1-33.*
Duan Peng et al, "A Diversity Algorithms of Timing Synchronization for MIMO-OFDM Systems in Mobile Environments", Wireless Communication, Networking and Mobile Computing, Sep. 1, 2006, pp. 1-4, XP031074196.

* cited by examiner

*Primary Examiner* — Derrick Ferris
*Assistant Examiner* — Faisal Choudhury
(74) *Attorney, Agent, or Firm* — Larry Liberchuk

(57) ABSTRACT

A wireless system and method including a medium access control (MAC) layer adapted to generate low peak-to-average power ratio binary preamble sequences for orthogonal frequency division multiplexing systems described.

18 Claims, 11 Drawing Sheets

METHOD OF GENERATING LOW PEAK-TO-AVERAGE POWER RATIO (PAPR) BINARY PREAMBLE SEQUENCES FOR OFDM SYSTEMS

The present application claims priority from U.S. Provisional Patent Application Ser. No. 60/884,937, filed on Jan. 15, 2007.

Wireless communication technology has significantly advanced making the wireless medium a viable alternative to wired solutions. As such, the use of wireless connectivity in data and voice communications continues to increase. These devices include mobile telephones, portable computers in wireless networks (e.g., wireless local area networks (WLANS), stationary computers in wireless networks, portable handsets, to name only a few).

As wireless applications continue to grow, so do the numbers of devices, networks and systems vying for the communications spectrum. As is known, there are dedicated or licensed portions as well as unlicensed portions of the communications spectrum. Because the unlicensed bands of the spectrum (e.g., the industrial, scientific and medical (ISM) radio bands) may be accessed freely, these bands tend to be heavily populated by users. Contrastingly, recent studies indicate that only a small portion of the licensed band is being used. Thus, much of the unlicensed band is overcrowded, while a relatively large portion of the licensed band remains unused. This had lead regulatory bodies (e.g., the Federal Communications Commission (FCC) of the U.S.) to an evaluation of current communication band allocations and their use.

One option for reallocation of the communications band involves the use of wireless networks adapted to dynamically access the communications spectrum. For example, dynamic spectrum access (DSA) wireless networks may be implemented in dedicated (licensed) portions of the communications spectrum. Illustratively, DSA wireless networks may operate in a spectrum normally dedicated for television transmission and reception. Thereby, certain portions of the communications band may be more fully utilized.

With the reallocation of certain communication bands for use by unlicensed (secondary) users, spectrum management is needed to ensure that licensed (primary or incumbent) users with priority access to the band are provided this access in an unfettered manner. For example, regulatory bodies (e.g., the FCC) may require that a secondary user vacate a channel in a relatively short period of time after an incumbent user begins occupation of the channel. Therefore, the medium access control (MAC) layer and physical (PHY) layer specifications must include provisions directed to this needed spectrum management.

The MAC layer of a DSA wireless network addresses the time varying occupancy of restricted channels/bands. Most orthogonal frequency domain systems (e.g., systems in accordance with protocols set forth in IEEE standards 802.11a/g/n, 802.16 and 802.22) use binary preamble sequences for initial acquisition, synchronization and channel estimation. One of the useful requirements for these signals is a low peak-to-average-power-ratio (PAPR). Mostly these sequences are determined by computer searches, and the standard explicitly specifies the sequence that is to be used.

What is needed, therefore, is a method of providing coordination of channel access in DSA wireless networks that function in restricted frequency channels and frequency bands.

For OFDM systems using large FFT sizes (e.g. 2048 or greater) arbitrary preamble sequences can be cumbersome, both in the specification and implementation. A method that employs shift register sequences would greatly simplify both aspects. Moreover, often more than one preamble sequence needs to be specified: a short preamble for initial acquisition and a long preamble for channel estimation. Unfortunately, known OFDM systems require preamble sequences in the frequency domain of the form $[0\ p_1\ p_2\ \ldots\ p_L\ 0\ \ldots\ 0\ p_{L+1}\ p_{L+2}\ \ldots\ p_{2L}]$, where the first "0" denotes a zero at DC, followed by L preamble symbols, followed by P zeroes for the band-edges and then L preamble symbols again. The FFT-size $N=2L+P+1$. Thus one cannot use length N shift register sequences directly and get good correlation and PAPR properties.

What is needed is a more general method of generating and implementing binary preamble sequences of arbitrary length and low PAPR.

In accordance with an example embodiment, in a wireless communication network, a method of wireless communication includes generating a short training sequence and a long training sequence in order to facilitate burst detection, synchronization and channel estimation at a receiver, wherein the short training sequence comprises a first non-zero symbol on an $i^{th}$ designated sub-carrier (i=integer) and a second non-zero symbol on a $j^{th}$ designated sub-carrier (j=integer), and wherein in a time domain, two repetitions of an N-sample vector (N=integer) in each of a plurality of orthogonal frequency division multiplexed (OFDM) symbols.

In accordance with another example embodiment, a wireless communication network includes: a wireless station having a sequence generator operative to generate a short training sequence and a long training sequence in order to facilitate burst detection, synchronization and channel estimation at a receiver, wherein the short training sequence comprises a first non-zero symbol on an $i^{th}$ designated sub-carrier (i=integer) and a second non-zero symbol on a $j^{th}$ designated sub-carrier (j=integer), and wherein in a time domain, two repetitions of an N-sample vector (N=integer) in each of a plurality of orthogonal frequency division multiplexed (OFDM) symbols.

The invention is best understood from the following detailed description when read with the accompanying drawing figures. It is emphasized that the various features are not necessarily drawn to scale. In fact, the dimensions may be arbitrarily increased or decreased for clarity of discussion.

Figure 1:
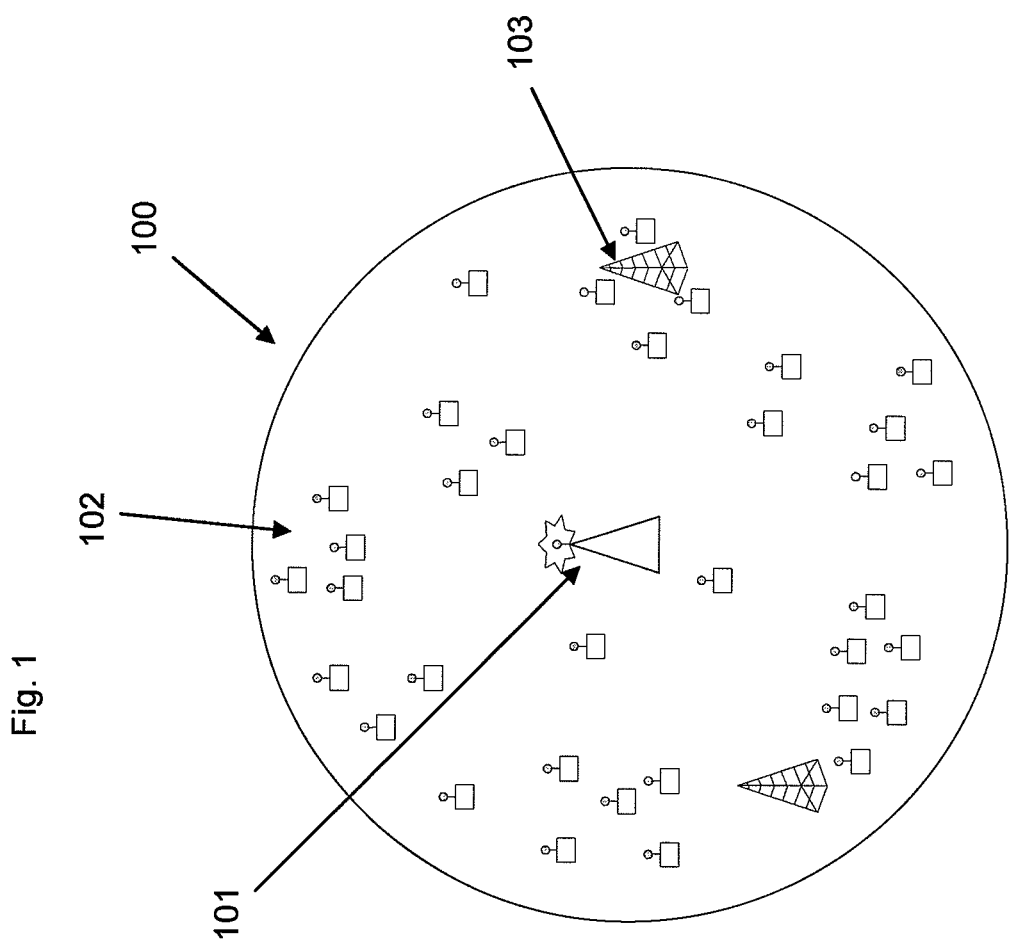
FIG. 1 is a simplified schematic diagram of a wireless communication system in accordance with a representative embodiment.

As used herein the term 'restricted frequency channel' or 'restricted channel' means a frequency channel dedicated for use by primary users. The restricted channels may be portions of the communications spectrum that is licensed by a regulatory body such as the FCC, or that are accessed on a priority basis by certain users. For example, the television channels in the United States are licensed frequency channels. However, certain device such as wireless microphones may access the network with priority over other users, even though the wireless microphones are not expressly licensed for use of the television spectrum.

Thus, certain unlicensed channels that are restricted channels are contemplated as restricted channels. In addition, so-called licensed-exempt channels, which provide priority access to certain users, are also restricted channels. As used herein, the terms 'a' and 'an' mean one or more; and the term 'plurality' means two or more.

In the following detailed description, for purposes of explanation and not limitation, example embodiments disclosing specific details are set forth in order to provide a thorough understanding of the present teachings. However, it will be apparent to one having ordinary skill in the art having had the benefit of the present disclosure that other embodiments that depart from the specific details disclosed herein. Moreover, descriptions of well-known devices, methods, systems and protocols may be omitted so as to not obscure the description of the example embodiments. Nonetheless, such devices, methods, systems and protocols that are within the purview of one of ordinary skill in the art may be used in accordance with the example embodiments. Finally, wherever practical, like reference numerals refer to like features.

It is noted that in the illustrative embodiments described herein, the network may be a wireless network with a centralized architecture or a decentralized architecture. Illustratively, the network may be one which functions under a DSA Medium Access (MAC) layer, such as to be defined under IEEE 802.22, or as defined under IEEE 802.16, IEEE 802.11, or IEEE 802.15. Moreover, the network may be a cellular network; a wireless local area network (WLAN); a wireless personal area network (WPAN); or a wireless regional area network (WRAN). The embodiments are described in connection with a medium access control layer (MAC) and physical layer (PHY) of the fixed point-to-multipoint wireless regional area networks operating in the VHF/UHF TV broadcast bands between 54 MHz and 862 MHz. Again, it is emphasized that this is merely illustrative and that applications to other systems are contemplated.

FIG. 1 is a simplified schematic view of a wireless network 100 in accordance with an illustrative embodiment. In a specific embodiment, the wireless network 100 is a centralized network. However, the present teachings may be generalized to a distributed wireless network.

The wireless network 100 includes an access point (AP) 101, which is also referred to as a base station (BS). The wireless network 100 further comprises a plurality of wireless stations (STAs) 102, which also may be referred to as wireless devices or as Customer Premise Equipment (CPE). The network may also include repeaters 103.

Illustratively, the wireless network 100 may be one of the types of networks noted previously. Moreover, the STAs 102 may be computers, mobile telephones, personal digital assistants (PDA), or similar device that typically operates in such networks. In a specific embodiment, at least one of the STAs 102 is stationary. It is contemplated that the STAs 102 are adapted to function in restricted frequency channels of a frequency band that requires protection of incumbent users. As such, the BS 101 and the STAs 102 are secondary devices and the network 100 is a secondary network. Often, for simplicity restricted frequency channels and restricted channels may be referred to as 'channels.'

It is noted that only a few STAs 102 are shown; this is merely for simplicity of discussion. Clearly, many other STAs 102 may be used. Finally, it is noted that the STAs 102 are not necessarily the same. In fact, a plethora of different types of STAs adapted to function under the chosen protocol may be used within the network 100.

The MAC layer methods and apparati of the example embodiments may be implemented in dynamic environments where the availability and quality of channels vary over time (e.g., new wireless technologies designed for the TV bands). Thus, the network of secondary STAs of the example embodiments beneficially obtain channel availability in a dynamic manner; and beneficially notify other secondary STAs of the occupation or future occupation of a channel by an incumbent device. As described in detail herein, the DSA MAC layer methods and apparati of the illustrative embodiments provide channel access instructions to the secondary STAs 102. Beneficially, the channel access instructions foster unfettered use of restricted channels/bands by the incumbent devices and access to restricted channels/bands by the secondary STAs.

Figure 2:
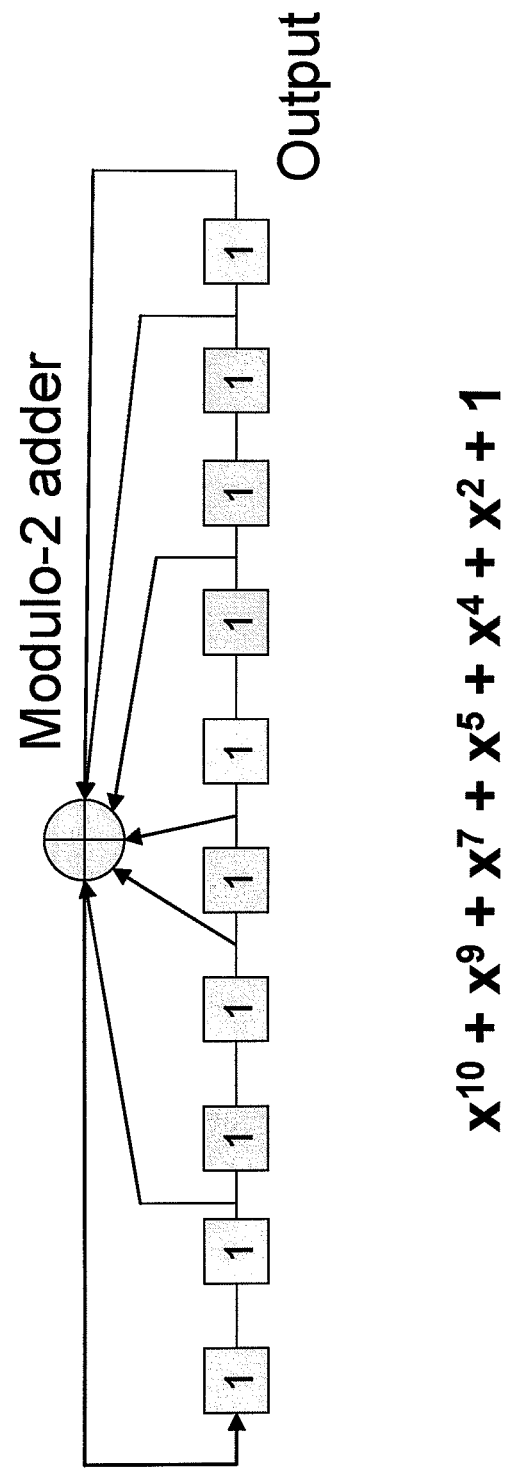
FIG. 2 is a conceptual representation in accordance with a representative embodiment.

FIG. 2 is a conceptual diagram of a shift register implementation 200 in accordance with a representative embodiment. The shift register 200 is illustratively implemented in a receiver of the STAs 102 in software. Two types of frequency domain sequences are defined in order to facilitate burst detection, synchronization and channel estimation at a WRAN receiver. The first sequence is referred to a short training (ST) sequence. This sequence is formed by inserting a non-zero symbol on every $4^{th}$ sub-carrier. For both the short training sequence and the long training sequence, the DC sub-carrier should be mapped to the center frequency of a single TV band. The superframe preamble is transmitted/repeated in all the available bands.

In time domain, this will result in 4 repetitions of a 512-sample vector in each OFDM symbol. The second sequence is referred to as a long training (LT) sequence. This sequence is formed by inserting a non-zero symbol on every $2^{nd}$ sub-carrier. In time domain, this will result in 2 repetitions of a 1024-sample vector in each OFDM symbol.

The ST and LT sequences are used to form the superframe, frame and CBP preambles as described herein. The sequences use binary (+1, −1) symbols in the frequency domain and are generated in a specific way from M-sequences to ensure low peak-to-average-power-ratio (PAPR). The duration of superframe is relatively large and as a result the channel response may change within the superframe duration. Moreover the superframe preamble is transmitted per band, while the frame could be transmitted across multiple bands. Therefore, the channel estimates that were derived using the superframe preamble may not be accurate for the frames. In addition, the channel estimation sequence can be used by the STAs 102 to re-initialize the fine frequency offset calculation. Therefore, the transmission of the long training sequence in the frame preamble is mandatory.

In the generation of a short training sequence, a periodic sequence $P_{REF}^{ST}$ with a period of 511 is generated using a pseudo-noise (PN) sequence generator with a polynomial of $X^9+X^8+X^6+X^5+X^3+X^2+1$. The PN sequence generator is initialized to a value of 1 1111 1111. The resultant $P_{REF}^{ST}$ (using BPSK mapping) is given as"

$P_{REF}^{ST}(0:510)=\{1, 1, 1, 1, 1, 1, 1, 1, 1, -1, -1, 1, -1, 1, -1, 1, -1, 1, -1, 1, \ldots, -1, -1, -1, -1, -1, -1, -1, 1, 1, 1, -1, -1, -1, -1, -1, -1, -1, -1, -1, 1, -1\}$ Next, $P_S^{ST}=P_{REF}^{ST}(S:S+510)$ is defined and $P_{488}^{ST}$ and $P_{277}^{ST}$ with are formed with first shift value, $S_1=488$ and second shift value, $S_2=277$, respectively. The first 210 symbols of these sequences are as follows:

$P_{488}^{ST}(0:209)=\{-1, -1, 1, -1, -1, -1, -1, -1, -1, -1, -1, 1, 1, -1, -1, -1, -1, -1, -1, -1, \ldots, -1, -1, -1, -1, -1, 1, -1, 1, -1, 1, -1, -1, -1, -1, -1, -1, 1, 1, -1, -1\}$, and $P_{277}^{ST}(0:209)=\{1, 1, -1, -1, -1, 1, -1, 1, -1, 1, 1, -1, 1, 1, 1, 1, -1, -1, 1, 1, \ldots, 1, 1, -1, 1, -1, -1, -1, -1, -1, 1, 1, -1, 1, 1, -1, -1, -1, -1, -1, -1\}$.

The sequences $P_{488}^{ST}(0:209)$ and $P_{277}^{ST}(0:209)$ are the first 210 bits of the following sequences in hex format:

$P_{488}^{ST}(0:209)$=203805FF2AB99A227875F4D4ECE9 163C851F3 D4530C410FC15030

$P_{277}^{ST}(0:209)$=C56F36BB65B724B8E5E8D6137C4AF19 42307BF5AB264770B41B00

The 2048 length frequency domain ST sequence is formed from the above two sequences using the following equation:

$$P_{ST}(k) = \begin{cases} \sqrt{\frac{N_T}{420}} \, P_{S_1}^{ST}\left(\frac{k-4}{4}\right) & 0 < k \leq 840, \text{ and, } k \bmod 4 = 0 \\ \sqrt{\frac{N_T}{420}} \, P_{S_2}^{ST}\left(\frac{k-1208}{4}\right) & 1208 \leq k \leq 2044, \text{ and, } k \bmod 4 = 0 \\ 0 & \text{otherwise} \end{cases}$$

and results in ST sequence as shown below $$P_{ST}(0:840) = \sqrt{\frac{N_T}{420}} \begin{Bmatrix} 0, 0, 0, 0, -1, 0, 0, 0, -1, 0, 0, 0, 1, 0, \\ 0, 0, -1, 0, 0, 0, \ldots, 0, 0, 0, -1, 0, 0, \\ 0, 1, 0, 0, 0, 1, 0, 0, 0, -1, 0, 0, 0, -1 \end{Bmatrix}$$

$P_{ST}(841:1207) = \{0, 0, 0, 0, 0, \ldots, 0, 0, 0, 0, 0,\}$ $$P_{ST}(1208:2047) = \sqrt{\frac{N_T}{420}} \begin{Bmatrix} 1, 0, 0, 0, 1, 0, 0, 0, -1, 0, 0, 0, \\ -1, 0, 0, 0, -1, 0, 0, 0, \ldots, \\ -1, 0, 0, 0, -1, 0, 0, 0, -1, \\ 0, 0, 0, -1, 0, 0, 0, -1, 0, 0, 0, \end{Bmatrix}$$

Taking the IFFT of the above sequence will generate 4 repetitions of a 512-sample vector in time domain. Another replica of this vector is transmitted in the GI. The factor $$\sqrt{\frac{N_T}{420}}$$

is used to normalize the signal energy, where $N_T$ represents the number of used sub-carriers.

In the generation of a long training sequence, a periodic sequence $P_{REF}^{LT}$ with a period of 1023 is generated using a pseudo-noise (PN) sequence generator with a polynomial of $X^{10}+X^9+X^7+X^5+X^4+X^2+1$. The PN sequence generator is initialized to a value of 11 1111 1111. The resultant $P_{REF}^{LT}$ (using BPSK mapping) is given as $P_{REF}^{LT}(0:1022)=\{1, 1, 1, 1, 1, 1, 1, 1, 1, -1, -1, 1, 1, 1, 1, -1, 1, -1, 1, 1, \ldots, 1, -1, 1, 1, -1, -1, -1, 1, -1, -1, -1, -1, 1, 1, -1, 1, -1, -1, 1, -1\}$ Second, define $P_S^{LT}=P_{REF}^{LT}(S:S+419)$ and form $P_{536}^{LT}$ and $P_{115}^{ST}$ with $S_1=536$ and $S_2=115$ respectively. The first 420 symbols of these sequences are as follows:

$P_{536}^{LT}(0:419)=\{1, 1, 1, 1, -1, -1, -1, 1, 1, 1, -1, -1, -1, 1, -1, -1, -1, 1, 1, -1, \ldots, 1, -1, -1, 1, -1, -1, 1, 1, 1, -1, -1, -1, 1, 1, -1, 1, 1, 1, 1, 1\}$, and $P_{115}^{LT}(0:419)=\{1, -1, 1, -1, 1, -1, -1, -1, -1, 1, 1, 1, -1, 1, 1, 1, 1, 1, 1, \ldots, 1, 1, -1, 1, -1, 1, 1, 1, -1, 1, 1, -1, -1, 1, -1, -1, 1, 1, 1, 1\}$ The 2048 element frequency domain LT sequence is formed from the above two sequences using the following equation:

$$P_{LT}(k) = \begin{cases} \sqrt{\frac{N_T}{840}} \, P_{536}^{LT}\left(\frac{k-2}{2}\right) & 0 < k \leq 840, \text{ and, } k \bmod 2 = 0 \\ \sqrt{\frac{N_T}{840}} \, P_{115}^{LT}\left(\frac{k-1208}{2}\right) & 1208 \leq k \leq 2046, \text{ and, } k \bmod 2 = 0 \\ 0 & \text{otherwise} \end{cases}$$

and results in LT sequence as shown below $$P_{LT}(0:840) = \sqrt{\frac{N_T}{840}} \begin{Bmatrix} 0, 0, 1, 0, 1, 0, 1, 0, 1, 0, -1, 0, \\ -1, 0, -1, 0, 1, 0, 1, 0, \ldots, \\ 0, -1, 0, -1, 0, 1, 0, 1, 0, -1, 0, \\ 1, 0, 1, 0, 1, 0, 1, 0, 1 \end{Bmatrix}$$

$P_{LT}(841:1207) = \{0, 0, 0, 0, 0, \ldots, 0, 0, 0, 0, 0\}$ $$P_{LT}(1208:2047) = \sqrt{\frac{N_T}{840}} \begin{Bmatrix} 1, 0, -1, 0, 1, 0, -1, 0, 1, 0, \\ -1, 0, -1, 0, -1, 0, -1, 0, 1, \\ 0, \ldots, 1, 0, -1, 0, -1, 0, 1, 0, \\ -1, 0, -1, 0, 1, 0, 1, 0, 1, 0 \end{Bmatrix}$$

Taking the IFFT of $P_{LT}$ will result in 2 repetitions of a 1024-sample vector in time domain.

As described above the training sequences are specified by the generator polynomial, initialization sequence, and the two shift values $S_1$ and $S_2$. Table 1 below lists the shift values $S_1$ and $S_2$ for 114 LT sequences with the same generator and initialization as above. These sequences all have low PAPR and low cross-correlation values.

TABLE 1

| Sequence Number | First Shift Value ($S_1$) | Second Shift Value ($S_2$) |
|---|---|---|
| 1 | 536 | 115 |
| 2 | 407 | 1009 |
| 3 | 904 | 483 |
| 4 | 898 | 477 |
| 5 | 1007 | 586 |
| 6 | 381 | 983 |
| 7 | 574 | 153 |
| 8 | 193 | 795 |
| 9 | 477 | 56 |
| 10 | 270 | 872 |
| 11 | 507 | 86 |
| 12 | 254 | 856 |
| 13 | 714 | 293 |
| 14 | 499 | 78 |
| 15 | 93 | 695 |
| 16 | 199 | 801 |
| 17 | 684 | 263 |
| 18 | 750 | 329 |
| 19 | 594 | 173 |

TABLE 1-continued

| Sequence Number | First Shift Value ($S_1$) | Second Shift Value ($S_2$) |
|---|---|---|
| 20 | 439 | 18 |
| 21 | 913 | 492 |
| 22 | 836 | 415 |
| 23 | 959 | 538 |
| 24 | 581 | 160 |
| 25 | 870 | 449 |
| 26 | 421 | 0 |
| 27 | 863 | 442 |
| 28 | 179 | 781 |
| 29 | 727 | 306 |
| 30 | 151 | 753 |
| 31 | 57 | 659 |
| 32 | 690 | 269 |
| 33 | 319 | 921 |
| 34 | 1019 | 598 |
| 35 | 277 | 879 |
| 36 | 667 | 246 |
| 37 | 555 | 134 |
| 38 | 879 | 458 |
| 39 | 842 | 421 |
| 40 | 163 | 765 |
| 41 | 886 | 465 |
| 42 | 4 | 606 |
| 43 | 399 | 1001 |
| 44 | 630 | 209 |
| 45 | 330 | 932 |
| 46 | 856 | 435 |
| 47 | 82 | 684 |
| 48 | 70 | 672 |
| 49 | 433 | 12 |
| 50 | 144 | 746 |
| 51 | 458 | 37 |
| 52 | 980 | 559 |
| 53 | 464 | 43 |
| 54 | 643 | 222 |
| 55 | 601 | 180 |
| 56 | 544 | 123 |
| 57 | 206 | 808 |
| 58 | 675 | 254 |
| 59 | 393 | 995 |
| 60 | 132 | 734 |
| 61 | 375 | 977 |
| 62 | 940 | 519 |
| 63 | 50 | 652 |
| 64 | 157 | 759 |
| 65 | 612 | 191 |
| 66 | 10 | 612 |
| 67 | 30 | 632 |
| 68 | 289 | 891 |
| 69 | 919 | 498 |
| 70 | 587 | 166 |
| 71 | 621 | 200 |
| 72 | 697 | 276 |
| 73 | 708 | 287 |
| 74 | 892 | 471 |
| 75 | 999 | 578 |
| 76 | 212 | 814 |
| 77 | 779 | 358 |
| 78 | 248 | 850 |
| 79 | 313 | 915 |
| 80 | 446 | 25 |
| 81 | 229 | 831 |
| 82 | 562 | 141 |
| 83 | 262 | 864 |
| 84 | 527 | 106 |
| 85 | 415 | 1017 |
| 86 | 22 | 624 |
| 87 | 988 | 567 |
| 88 | 720 | 299 |
| 89 | 452 | 31 |
| 90 | 187 | 789 |
| 91 | 636 | 215 |
| 92 | 763 | 342 |
| 93 | 493 | 72 |
| 94 | 120 | 722 |
| 95 | 172 | 774 |
| 96 | 38 | 640 |
| 97 | 222 | 824 |
| 98 | 106 | 708 |
| 99 | 658 | 237 |
| 100 | 974 | 553 |
| 101 | 64 | 666 |
| 102 | 828 | 407 |
| 103 | 756 | 335 |
| 104 | 797 | 376 |
| 105 | 283 | 885 |
| 106 | 926 | 505 |
| 107 | 1013 | 592 |
| 108 | 99 | 701 |
| 109 | 44 | 646 |
| 110 | 298 | 900 |
| 111 | 934 | 513 |
| 112 | 363 | 965 |
| 113 | 427 | 6 |
| 114 | 568 | 147 |

In representative embodiments, a superframe preamble is used by the receiver for frequency and time synchronization. Since the receiver also has to decode a superframe control header (SCH), the receiver needs to determine the channel response. Therefore, the superframe preamble also includes a channel estimation field.

Figure 3:
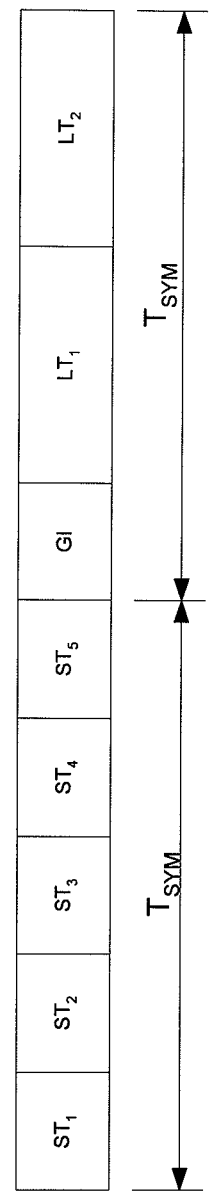
FIG. 3 is a conceptual view of a superframe preamble in accordance with a representative embodiment.

The format of the superframe preamble is shown in FIG. 3. The superframe preamble is two OFDM symbols in duration and consists of 5 repetitions of the short training sequence and 2 repetitions of the long training sequence. The guard interval is only used for the long training sequence. The length of the guard interval for the Superframe preamble is given as $T_{GI}=\frac{1}{4}T_{FFT}$. The ST sequence and the LT sequence are generated as described earlier. The shift values $S_1$ and $S_2$ for the LT sequence is determined by the sequence number, which in turn is derived from base station ID and cell ID.

The duration of superframe preamble is $T_{superframe\ preamble}$=746.666 ms (assuming 6 MHz based TV channels).

Figure 4:
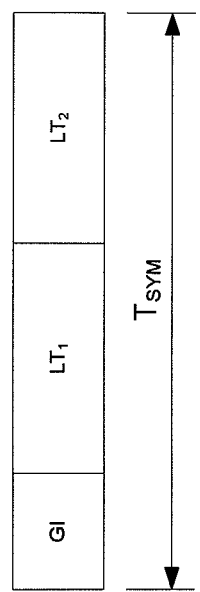
FIG. 4 is a conceptual view of a CBP packet in accordance with a representative embodiment.

For both the short training sequence and the long training sequence, the DC sub-carrier may be mapped to the center frequency of a single TV band. The superframe preamble is transmitted/repeated in all the available bands The format of the frame preamble is shown in FIG. 4. The frame preamble will use the $T_{GI}$ specified by SCH. For single channel operation, the first frame in the superframe shall not contain a preamble. The sequence used in superframe preamble shall be used in the frame preamble as well.

The duration of superframe is relatively large and as a result the channel response may change within the superframe duration. Moreover the superframe preamble is transmitted per band, while the frame could be transmitted across multiple bands. Therefore, the channel estimates that were derived using the superframe preamble may not be accurate for the frames. In addition, the channel estimation sequence can be used by the CPEs to re-initialize the fine frequency offset calculation. Therefore, the transmission of the long training sequence in the frame preamble is mandatory.

The CBP preamble is composed of one OFDM symbol. The ST sequence is generated as described herein with $S_1$=233 and $S_2$=22. These shifts generate a preamble that has low cross-correlation with the superframe preamble, since the CBP preamble should be distinct from the superframe preamble. The sequences $P_{233}^{ST}(0:209)$ and $P_{22}^{ST}(0:209)$ are the first 210 bits of the following sequences in hex format:
$P_{233}^{ST}(0:209)$=2939C5D0D3EC56F36BB65B72 4B8E5E8D6 137C4AF1942307BF5AB0

$P_{22}^{ST}(0:209)$=33444F0EBE9A9D9D22C790A3E7A8 A618821F82A067F754B31BBD8

The super frame control header includes information such as the number of channels, number of frames, channel number, etc. It also includes a variable number of IEs, due to which the length of SCH is also variable (with a minimum of 19 bytes and a maximum of 42 bytes).

The superframe control header is encoded using the methods/modules described in connection with forward error correction herein. The SCH is transmitted using the basic data rate mode. The 15-bit randomizer initialization sequence shall be set to all is (i.e. 1111 1111 1111 111). The SCH shall be decoded by all the CPEs associated with that BS (or in the region of that BS).

The super frame control header is transmitted in all the sub-channels. Since the superframe control header has to be decoded by all the CPEs in the range of the BS, the SCH has to be repeated in all the bands.

The 42 bytes of the SCH are encoded by a rate-½ convolutional coder and after interleaving are mapped using QPSK constellation resulting in 336 symbols. In order to improve the robustness of SCH and to make better utilization of the available sub-carriers, spreading by a factor of 4 is applied to the output of the mapper:

$$\begin{bmatrix} S_i \\ S_{i+336} \\ S_{i+672} \\ S_{i+1008} \end{bmatrix} = \begin{bmatrix} 1 \\ 1 \\ 1 \\ 1 \end{bmatrix} [D_i]$$

$$i = 0, 1, 2, \ldots, 335$$

Where $D_i$ represents the $i^{th}$ QPSK symbol and $S_k$ represents the symbol on $k^{th}$ data sub-carrier. Using the sub-carrier allocation for the SCH, $S_0$ will be mapped to SubCarrier (1,2), $S_1$ will be mapped to SubCarrier (1,3), etc.

The above spreading operation will result in 1344 symbols which would occupy 28 sub-channels (see sub-carrier allocation section for the definition of sub-channel). This will free up 2 sub-channels on each of the band-edges, which are therefore defined as guard sub-channels. The additional guard sub-carriers at the band-edges will enable the CPEs to better decode the SCH. The 2K IFFT vector thus formed is replicated to generate the 4K and 6K length IFFT vectors in case of channel bonding. The $T_{GI}$ to $T_{FFT}$ ratio is ¼ for the SCH.

The SCH uses only 28 sub-channels. The sub-carrier allocation is defined by the following equation:

$$SubCarrier(n, k) = N_{ch} \times (k - 28) + (n - 1)$$
$$n = 1, 2, \ldots, N_{ch} = 28$$
$$k = 1, 2, \ldots, 27$$
$$SubCarrier(n, k) = N_{ch} \times (k - 27) + (n - 1)$$
$$n = 1, 2, \ldots, N_{ch} = 28,$$
$$k = 28, 29, \ldots, 54$$

where
 n sub-channel index
 k sub-carrier index

The 6 pilot sub-carriers are then identified within each sub-channel. The pilot sub-carriers are distributed uniformly across the used sub-carries in the SCH symbol. Every $9^{th}$ sub-carrier starting with the first is designated as the pilot sub-carrier. The sub-carrier indices of the pilots in the SCH are: {−756, −747, −738 . . . −18, −9, 9, 18 . . . 738, 747, 756}. The rest of the sub-carriers in the sub-channel are then designated as data sub-carriers.

Figure 5:
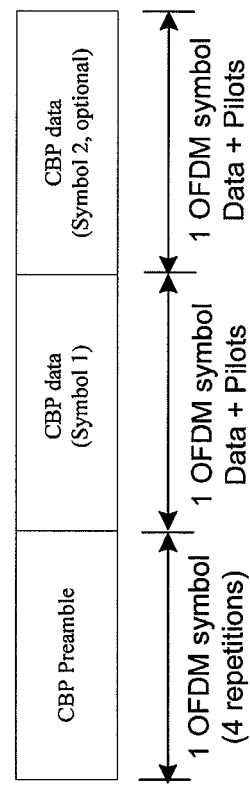
FIG. 5 is a conceptual view of a superframe preamble in accordance with a representative embodiment.

The format of CBP packet is shown in FIG. 5. The CBP packet consists of a preamble portion and a data portion. The CBP preamble is one OFDM symbol in duration and is generated as described above. The CBP data portion could be either one or two OFDM symbols in duration. The length field in the first symbol enables a receiver to determine the presence or absence of the second data symbol.

The CBP preamble consists of 4 repetitions of a short training sequence. A receiver can use the first two short training sequences in this field for acquisition and AGC setting and the next two short training sequences for frequency offset estimation. The CBP data symbols consist of the data and the pilot sub-carriers. From the 1680 used sub-carriers, 426 sub-carriers are designated as pilot sub-carriers and the remaining 1254 sub-carriers are designated as data sub-carriers.

Figure 6:
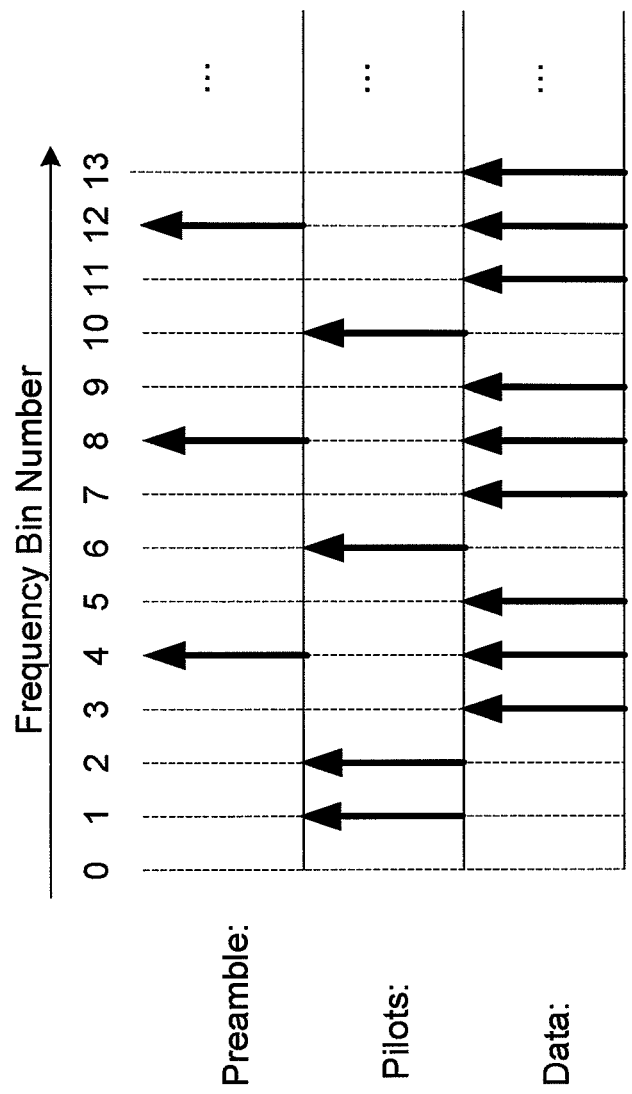
FIG. 6 is a conceptual diagram showing the location of the non-zero sub-carriers in the CBP preamble and the location of pilot and data sub-carriers in the CBP data symbols in accordance with a representative embodiment.

The location of the non-zero sub-carriers in the CBP preamble and the location of pilot and data sub-carriers in the CBP data symbols is given below and is illustrated conceptually in FIG. 6.

Location of non-zero sub-carriers in the CBP preamble symbol: (4, 8, 12, 16, . . . 832, 836, 840, 1208, 1212, 1216, . . . , 2036, 2040, 2044)

Location of 426 pilot sub-carriers in the data portion: (1, 2, 6, 10, . . . 830, 834, 838, 839, 840, 1208, 1209, 1210, 1214, 1218, . . . , 2038, 2042, 2046, 2047)

Location of 1254 data sub-carriers in the data portion: ((3, 4, 5), (7, 8, 9), (11, 12, 13), . . . (831, 832, 833), (835, 836, 837), (1211, 1212, 1213), (1215, 1216, 1217), (1219, 1220, 1221), . . . (2039, 2040, 2041), (2043, 2044, 2045))

Figure 7:
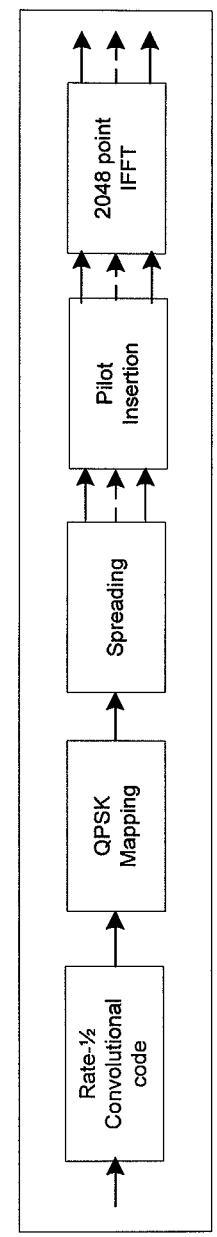
FIG. 7 is a simplified block diagram of CBP data encoder and mapper in accordance with a representative embodiment.

FIG. 7 shows a simplified block diagram of a CBP data encoder and mapper. The CBP payload is divided in to blocks of 418 bits before encoding and mapping. Each block of 418 bits is first encoded using a rate-½ convolutional code. The encoded bits are then mapped using QPSK constellation and results in 418 symbols. Each of these QPSK symbols is transmitted on three sub-carriers in order to provide additional frequency diversity. The spreading function is described by the following equation:

$$\begin{bmatrix} S_i \\ S_{i+418} \\ S_{i+836} \end{bmatrix} = \begin{bmatrix} 1 \\ 1 \\ 1 \end{bmatrix} [D_i]$$

$$i = 0, 1, 2, \ldots, 417$$

Where $D_i$ represents the $i^{th}$ QPSK symbol and $S_k$ represents the symbol on $k^{th}$ data sub-carrier. The 1254 spreaded symbols are inserted in their corresponding locations as described above. This will result in symbol $S_0$ being inserted in frequency bin 3, symbol $S_1$ in frequency bin 4, symbol $S_2$ in frequency bin 5, symbol $S_3$ in frequency bin 7, etc. The 426 pilot symbols are then inserted in their designated frequency bins. The resultant vector is then transformed in to time domain using an IFFT module.

A standard receiver can combine the pilot symbols with the preamble symbols and then perform interpolation to derive channel estimates. These channel estimates can then be used to equalize the CBP data symbols. The receiver can also use maximal ratio combining (MRC) to de-spread the data symbols. Decoding using Viterbi algorithm is recommended.

In some applications, such as 802.16 and 802.22 a preamble sequence set is required because the base station in each cell uses one of the sequences from the set as an identification. In addition to having low PAPR, the auto and cross-correlation properties of the sequence set in both time and frequency domain need to be such that a receiver can use simple correlation methods to determine which sequence has been received. The method described above can be used to build up such a sequence set by incorporating the autocorrelation and cross-correlation of each sequence pair as metrics to decide if a sequence should be added to the set or not. Each sequence is derived from the same generator and is identified by its two shift parameters.

Figure 8:
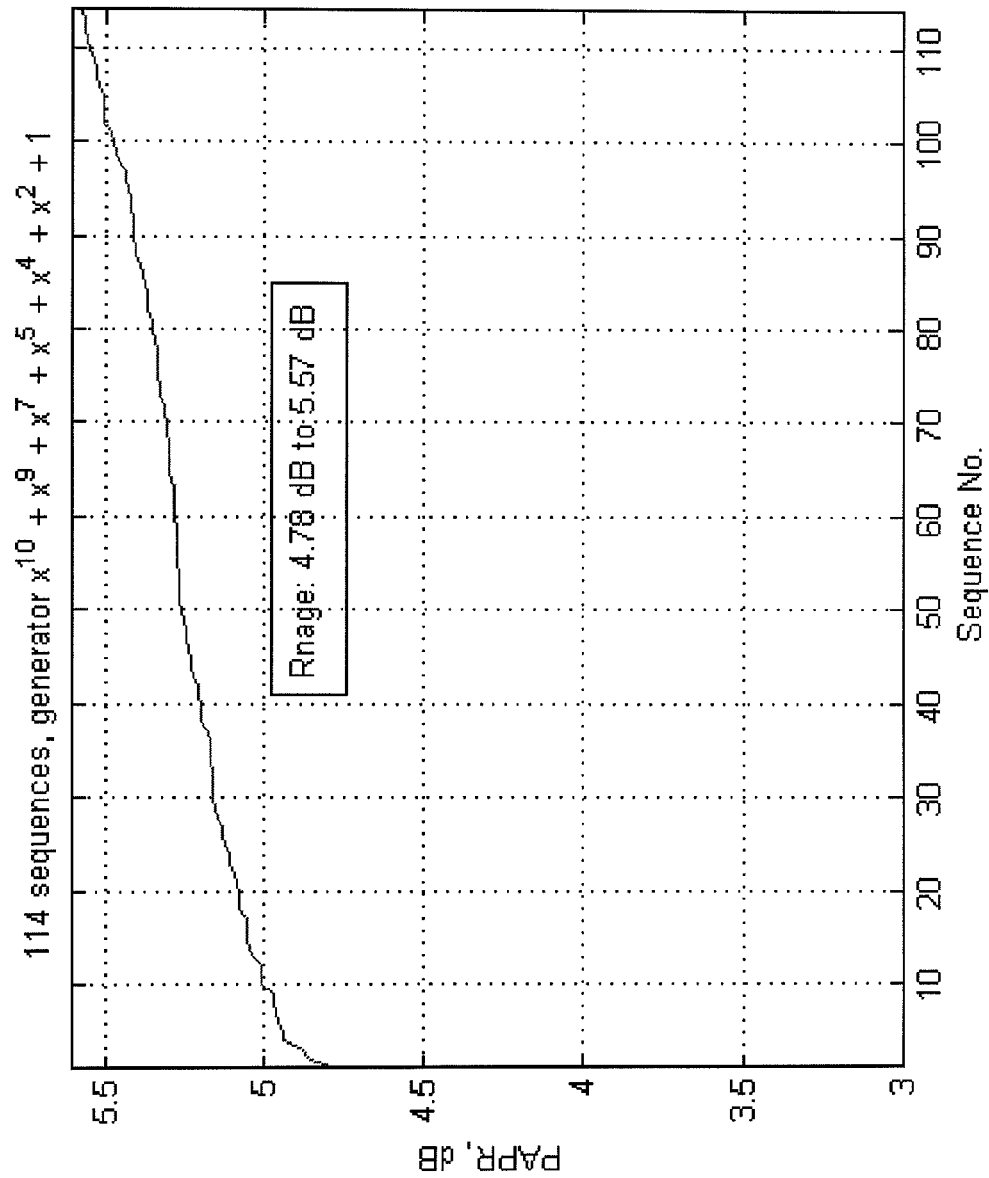
FIG. 8 is a graphical representation of PAPR versus sequence number in accordance with a representative embodiment.
Figure 9:
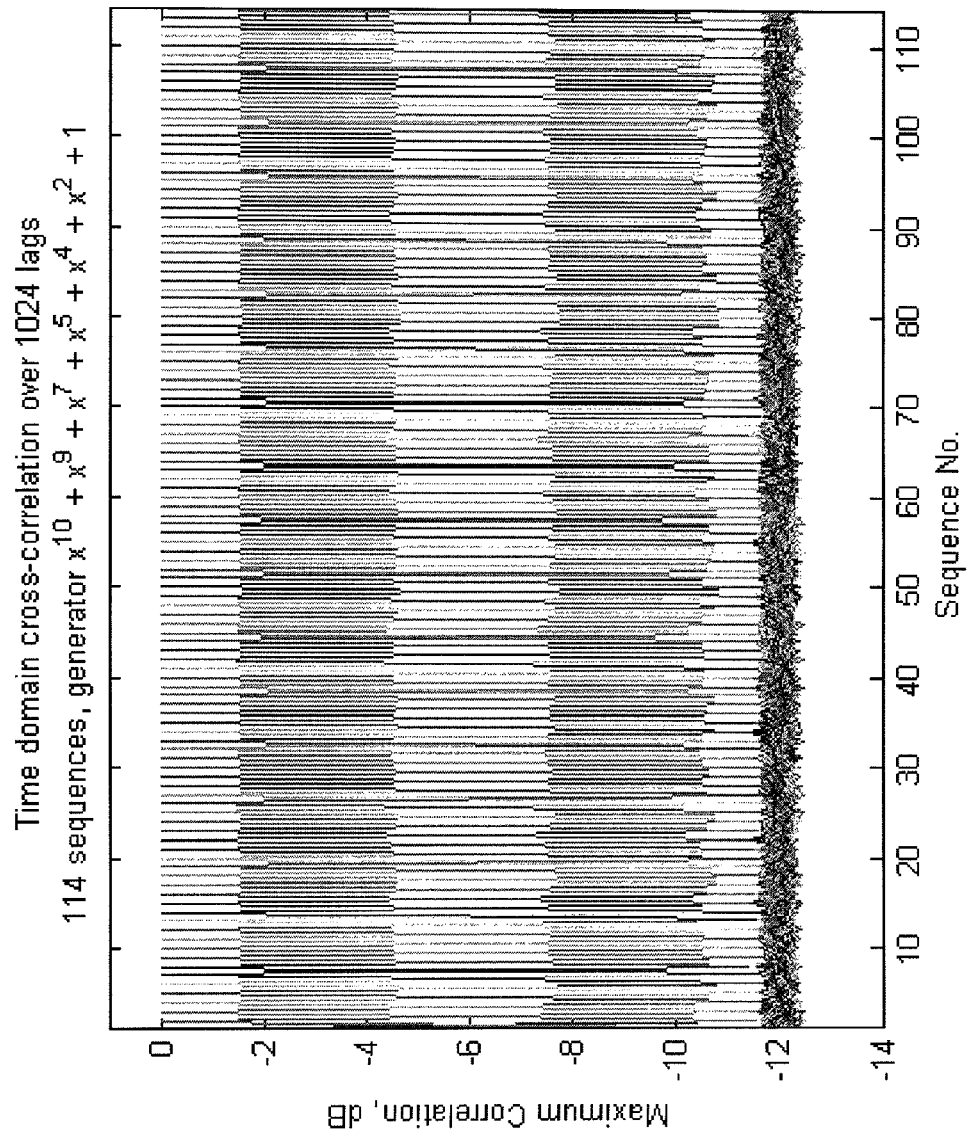
FIG. 9 is a graphical representation of cross-correlation versus sequence number (time domain) in accordance with a representative embodiment.
Figure 10:
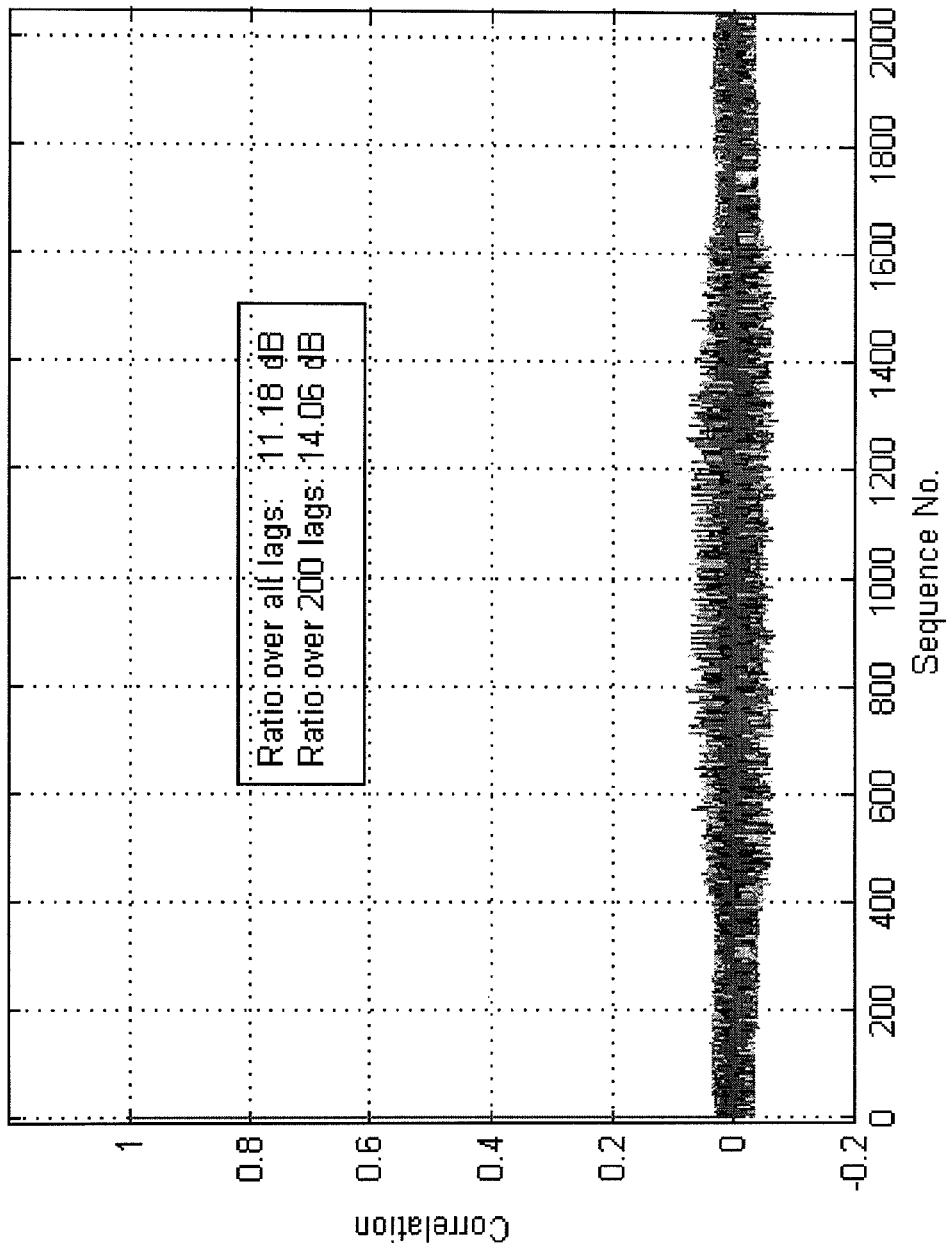
FIG. 10 is a graphical representation of autocorrelation versus sequence number (frequency domain) in accordance with a representative embodiment.
Figure 11:
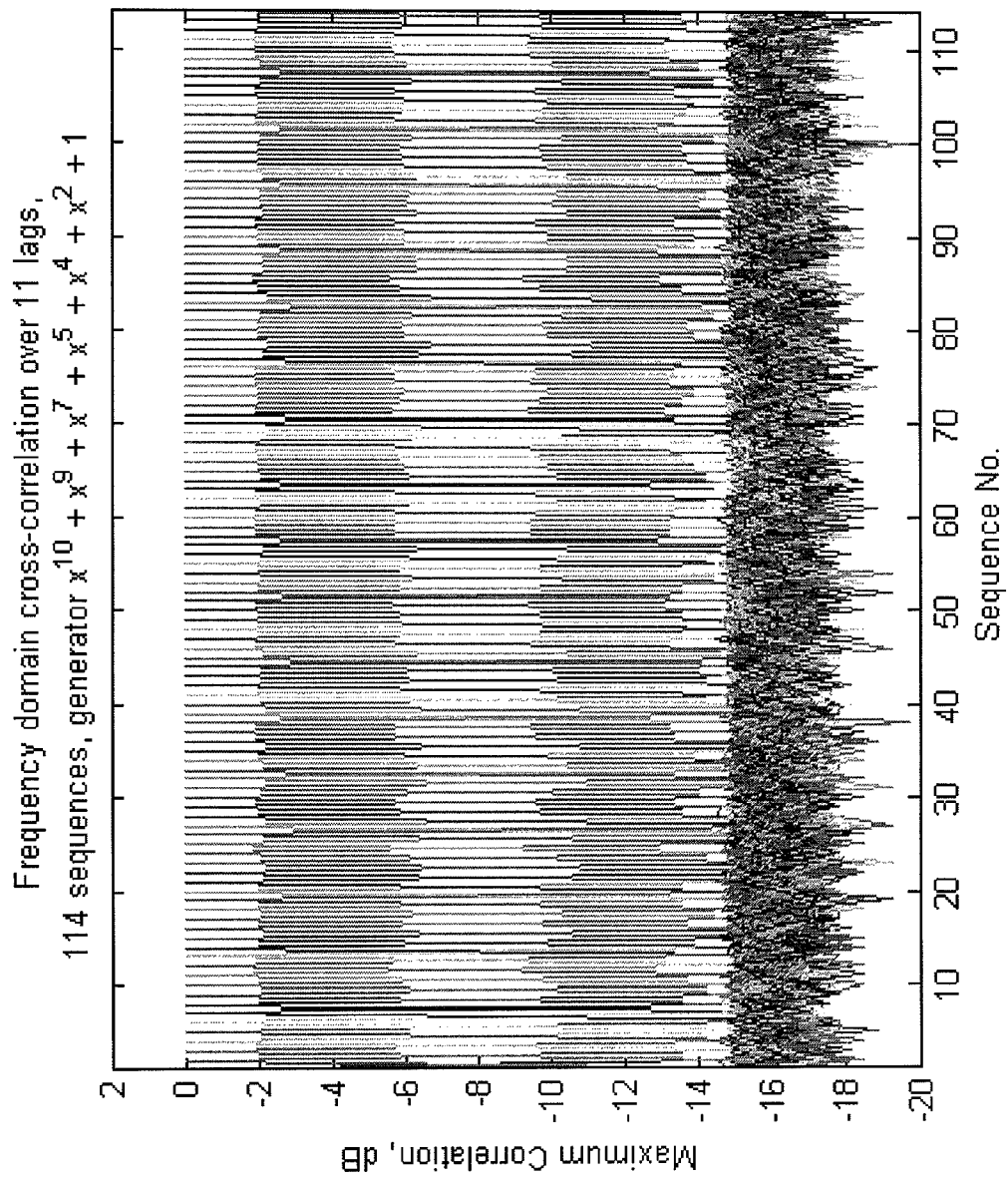
FIG. 11 is a graphical representation of cross-correlation versus sequence number (frequency domain) in accordance with a representative embodiment.

In FIGS. 8 to 11 the properties for a sequence set containing 114 sequences are set forth with the shifts described in Table 1. FIG. 8 show the PAPR of each sequence in the set. FIG. 9 shows that the maximum time domain cross correlation between any 2 sequences in the set for all possible time lags is about −12 dB, which is low enough to enable robust sequence identification. FIG. 10 show the frequency domain cyclic autocorrelation for each sequence in the set for all lags. Again the sequences have very low correlation for lags other than zero, enabling frequency domain synchronization implementation. FIG. 11 shows the maximum frequency domain cyclic cross-correlation over 11 frequency lags between any 2 sequences.

In view of this disclosure it is noted that the various methods and devices described herein can be implemented in hardware and software. Further, the various methods and parameters are included by way of example only and not in any limiting sense. In view of this disclosure, those skilled in the art can implement the present teachings in determining their own techniques and needed equipment to effect these techniques, while remaining within the scope of the appended claims.

The invention claimed is:

1. In a wireless communication network, a method of wireless communication, comprising:
    generating a short training sequence and a long training sequence in order to facilitate burst detection, synchronization and channel estimation at a receiver, wherein the short training sequence comprises a first non-zero symbol on an $i^{th}$ designated sub-carrier (i=integer) and the long training sequence comprises a second non-zero symbol on a $j^{th}$ designated sub-carrier (j=integer), the long training sequence being a generated pseudo-noise (PN) sequence generated according to a polynomial, the polynomial being $x^{10}+x^9+x^7+x^5+x^4+x^2+1$, resulting, in a time domain, in two repetitions of an N-sample vector (N=integer) in each of a plurality of orthogonal frequency division multiplexed (OFDM) symbols.

2. The method as claimed in claim 1, wherein the long training sequence is shifted by two shift values, S1 and S2.

3. The method as claimed in claim 2, wherein the two shift values S1 and S2 are selected from the group of pairs consisting of {536, 115}; {407, 1009}; {904, 483}; {898, 477}; {1007, 586}; {381, 983}; {574, 153}; {193, 795}; {477, 56}; {270, 872}; {507, 86}; {254, 856}; {714, 293}; {499, 78}; {93, 695}; {199, 801}; {684, 263}; {750, 329}; {594, 173}; {439, 18}; {913, 492}; {836, 415}; {959, 538}; {581, 160}; {870, 449}; {421, 0}; {863, 442}; {179, 781}; {727, 306}; {151, 753}; {57, 659}; {690, 269}; {319, 921}; {1019, 598}; {277, 879}; {667, 246}; {555, 134}; {879, 458}; {842, 421}; {163, 765}; {886, 465}; {4, 606}; {399, 1001}; {630, 209}; {330, 932}; {856, 435}; {82, 684}; {70, 672}; {433, 12}; {144, 746}; {458, 37}; {980, 559}; {464, 43}; {643, 222}; {601, 180}; {544, 123}; {206, 808}; {675, 254}; {393, 995}; {132, 734}; {375, 977}; {940, 519}; {50, 652}; {157, 759}; {612, 191}; {10, 612}; {30, 632}; {289, 891}; {919, 498}; {587, 166}; {621, 200}; {697, 276}; {708, 287}; {892, 471}; {999, 578}; {212, 814}; {779, 358}; {248, 850}; {313, 915}; {446, 25}; {229, 831}; {562, 141}; {262, 864}; {527, 106}; {415, 1017}; {22, 624}; {988, 567}; {720, 299}; {452, 31}; {187, 789}; {636, 215}; {763, 342}; {493, 72}; {120, 722}; {172, 774}; {38, 640}; {222, 824}; {106, 708}; {658, 237}; {974, 553}; {64, 666}; {828, 407}; {756, 335}; {797, 376}; {283, 885}; {926, 505}; {1013, 592}; {99, 701}; {44, 646}; {298, 900}; {934, 513}; {363, 965}; {427, 6}; and {568, 147}.

4. The method as claimed in claim 1, wherein i=2.

5. The method as claimed in claim 1, wherein j=4.

6. The method as claimed in claim 1, wherein the first non-zero symbol is provided on every $i^{th}$ sub-carrier and the second non-zero symbol is provided on every $j^{th}$ sub-carrier.

7. The method as claimed in claim 1, wherein N=1024.

8. The method as claimed in claim 1, further comprising generating a preamble set of short and long training sequences, wherein the generated sequences provide a base station ID.

9. A wireless communication network, comprising:
    a wireless station having a sequence generator operative to generate a short training sequence and a long training sequence in order to facilitate burst detection, synchronization and channel estimation at a receiver, the short training sequence comprising a first non-zero symbol on an $i^{th}$ designated sub-carrier (i=integer) and the long training sequence comprises a second non-zero symbol on a $j^{th}$ designated sub-carrier (j=integer), the long training sequence being a generated pseudo-noise (PN) sequence generated according to a polynomial, the polynomial being $x^{10}+x^9+x^7+x^5+x^4+x^2+1$, resulting, in a time domain, in two repetitions of an N-sample vector (N=integer) in each of a plurality of orthogonal frequency division multiplexed (OFDM) symbols.

10. The wireless communication network as claimed in claim 9, wherein the long training sequence is shifted by two shift values, S1 and S2.

11. The wireless communication network as claimed in claim 10, wherein the two shift values S1 and S2 are selected from the group of pairs consisting of {536, 115}; {407, 1009}; {904, 483}; {898, 477}; {1007, 586}; {381, 983}; {574, 153}; {193, 795}; {477, 56}; {270, 872}; {507, 86}; {254, 856}; {714, 293}; {499, 78}; {93, 695}; {199, 801}; {684, 263}; {750, 329}; {594, 173}; {439, 18}; {913, 492}; {836, 415}; {959, 538}; {581, 160}; {870, 449}; {421, 0}; {863, 442}; {179, 781}; {727, 306}; {151, 753}; {57, 659}; {690, 269}; {319, 921}; {1019, 598}; {277, 879}; {667, 246}; {555, 134}; {879, 458}; {842, 421}; {163, 765}; {886, 465}; {4, 606}; {399, 1001}; {630, 209}; {330, 932}; {856, 435}; {82, 684}; {70, 672}; {433, 12}; {144, 746}; {458, 37}; {980, 559}; {464, 43}; {643, 222}; {601, 180}; {544, 123}; {206, 808}; {675, 254}; {393, 995}; {132, 734}; {375, 977}; {940, 519}; {50, 652}; {157, 759}; {612, 191}; {10, 612}; {30, 632}; {289, 891}; {919, 498}; {587, 166}; {621, 200}; {697, 276}; {708, 287}; {892, 471}; {999, 578}; {212, 814}; {779, 358}; {248, 850}; {313, 915}; {446, 25}; {229, 831}; {562, 141}; {262, 864}; {527, 106}; {415, 1017}; {22, 624}; {988, 567}; {720, 299}; {452, 31}; {187, 789}; {636, 215}; {763, 342}; {493, 72}; {120, 722}; {172, 774}; {38, 640}; {222, 824}; {106, 708}; {658, 237}; {974, 553}; {64, 666}; {828, 407}; {756, 335}; {797, 376}; {283, 885}; {926, 505}; {1013, 592}; {99, 701}; {44, 646}; {298, 900}; {934, 513}; {363, 965}; {427, 6}; and {568, 147}.

12. The wireless communication network as claimed in claim 9, wherein i=2.

13. The wireless communication network as claimed in claim 9, wherein j=4.

14. The wireless communication network as claimed in claim 9, wherein the first non-zero symbol is provided on every $i^{th}$ sub-carrier and the second non-zero symbol is provided on every $j^{th}$ sub-carrier.

15. The wireless communication network as claimed in claim 9, wherein N=1024.

16. The wireless communication network as claimed in claim 9, wherein the sequence generator is operative to generate a preamble set of short and long training sequences, wherein the generated sequences provide a base station ID.

17. In a wireless communication network, a method of wireless communication, comprising:
   generating by a wireless station a short training sequence and a long training sequence, the short training sequence including a first non-zero symbol on an $i^{th}$ designated sub-carrier (i=integer) and the long training sequence including a second non-zero symbol on a $j^{th}$ designated sub-carrier (j=integer); the long training sequence being shifted by two shift values, S1 and S2, and being a generated pseudo-noise (PN) sequence generated according to a polynomial, the polynomial being $x^{10}+x^9+x^7+x^5+x^4+x^2+1$, resulting, in a time domain, in two repetitions of an N-sample vector (N=integer) in each of a plurality of orthogonal frequency division multiplexed (OFDM) symbols.

18. The method as claimed in claim 17, wherein the two shift values S1 and S2 are selected from the group of pairs consisting of {536, 115}; {407, 1009}; {904, 483}; {898, 477}; {1007, 586}; {381, 983}; {574, 153}; {193, 795}; {477, 56}; {270, 872}; {507, 86}; {254, 856}; {714, 293}; {499, 78}; {93, 695}; {199, 801}; {684, 263}; {750, 329}; {594, 173}; {439, 18}; {913, 492}; {836, 415}; {959, 538}; {581, 160}; {870, 449}; {421, 0}; {863, 442}; {179, 781}; {727, 306}; {151, 753}; {57, 659}; {690, 269}; {319, 921}; {1019, 598}; {277, 879}; {667, 246}; {555, 134}; {879, 458}; {842, 421}; {163, 765}; {886, 465}; {4, 606}; {399, 1001}; {630, 209}; {330, 932}; {856, 435}; {82, 684}; {70, 672}; {433, 12}; {144, 746}; {458, 37}; {980, 559}; {464, 43}; {643, 222}; {601, 180}; {544, 123}; {206, 808}; {675, 254}; {393, 995}; {132, 734}; {375, 977}; {940, 519}; {50, 652}; {157, 759}; {612, 191}; {10, 612}; {30, 632}; {289, 891}; {919, 498}; {587, 166}; {621, 200}; {697, 276}; {708, 287}; {892, 471}; {999, 578}; {212, 814}; {779, 358}; {248, 850}; {313, 915}; {446, 25}; {229, 831}; {562, 141}; {262, 864}; {527, 106}; {415, 1017}; {22, 624}; {988, 567}; {720, 299}; {452, 31}; {187, 789}; {636, 215}; {763, 342}; {493, 72}; {120, 722}; {172, 774}; {38, 640}; {222, 824}; {106, 708}; {658, 237}; {974, 553}; {64, 666}; {828, 407}; {756, 335}; {797, 376}; {283, 885}; {926, 505}; {1013, 592}; {99, 701}; {44, 646}; {298, 900}; {934, 513}; {363, 965}; {427, 6}; and {568, 147}.

* * * * *